(12) United States Patent
Yoon

(10) Patent No.: US 9,592,791 B2
(45) Date of Patent: Mar. 14, 2017

(54) ADVANCED SEATBELT APPARATUS

(71) Applicant: Joseph Y. Yoon, Oakland Township, MI (US)

(72) Inventor: Joseph Y. Yoon, Oakland Township, MI (US)

(*) Notice: Subject to any disclaimer, the term of this patent is extended or adjusted under 35 U.S.C. 154(b) by 0 days.

(21) Appl. No.: 14/711,104

(22) Filed: May 13, 2015

(65) Prior Publication Data

US 2016/0082922 A1 Mar. 24, 2016

Related U.S. Application Data

(60) Provisional application No. 62/052,742, filed on Sep. 19, 2014.

(51) Int. Cl.
| | | |
|---|---|---|
| *B60R 22/46* | (2006.01) | |
| *B60R 22/40* | (2006.01) | |
| *B60R 22/36* | (2006.01) | |
| *B60R 22/48* | (2006.01) | |

(52) U.S. Cl.
CPC ............. *B60R 22/46* (2013.01); *B60R 22/36* (2013.01); *B60R 22/40* (2013.01); *B60R 2022/469* (2013.01); *B60R 2022/4666* (2013.01); *B60R 2022/4833* (2013.01)

(58) Field of Classification Search
CPC ......... B60R 22/46; B60R 22/40; B60R 22/36; B60R 2022/468; B60R 2022/469; B60R 2022/4666; B60R 2022/4833
USPC ............... 280/806; 242/384.6, 384.2, 384; 297/476, 478, 479, 480; 701/45
See application file for complete search history.

(56) References Cited

U.S. PATENT DOCUMENTS

| | | | |
|---|---|---|---|
| 7,284,769 B2 | 10/2007 | Breed | |
| 7,673,906 B2 | 3/2010 | Bell | |
| 7,905,515 B2 | 3/2011 | Heurlin et al. | |
| 8,095,275 B2 | 1/2012 | Foo et al. | |
| 8,165,760 B2 | 4/2012 | Cuddihy et al. | |
| 8,172,267 B2 | 5/2012 | Eberle et al. | |
| 8,366,034 B2 | 2/2013 | Harada et al. | |
| 8,469,401 B2 | 6/2013 | Humbert et al. | |
| 8,594,894 B2 | 11/2013 | Baumann et al. | |
| 8,820,789 B2 | 9/2014 | Merrill et al. | |
| 2004/0195420 A1* | 10/2004 | Schnabl .................. B60R 22/46 242/374 |
| 2006/0226640 A1 | 10/2006 | Prakah-Asante et al. | |
| 2009/0299633 A1 | 12/2009 | Hawes et al. | |
| 2012/0025588 A1 | 2/2012 | Humbert et al. | |
| 2013/0256443 A1* | 10/2013 | Elizondo ................. B60R 22/40 242/384 |
| 2014/0358379 A1 | 12/2014 | Nakazawa | |

* cited by examiner

*Primary Examiner* — Keith Frisby
(74) *Attorney, Agent, or Firm* — Young Basile Hanlon & MacFarlane, P.C.

(57) ABSTRACT

A vehicle seatbelt apparatus includes a seatbelt web wrapped in a reel around a motor-rotated shaft. A latch is selectively engageable with the reel to lock a seatbelt retractor from movement in one direction while allowing movement of the retractor under motor rotation of the shaft in response to pre-crash vehicle braking deceleration, a vehicle downhill angle or a vehicle lateral "g" force exceeding a threshold. When a retractor locked position is detected, the motor is activated to retract the seatbelt web for a predetermined time period to urge the passenger toward a center upright position in a vehicle seat.

13 Claims, 3 Drawing Sheets

ADVANCED SEATBELT APPARATUS

CROSS REFERENCE TO CO-PENDING APPLICATION

This application claims priority benefit to the Sep. 19, 2014 filing date of U.S. provisional patent application Ser. No. 62/052,742, filed in the name of Joseph Y. Yoon, and entitled Advanced Seatbelt Apparatus, the contents of which are incorporated herein in its entirety.

BACKGROUND

The present advanced seatbelt system relates, in general, to vehicle seatbelt systems.

Many passenger vehicles are equipped with an ELR (Emergency Locking Retractor) or ALR (Automatic Locking Retractor) type seat belts. Both types of seatbelts latch when vehicle brakes or the vehicle is in a steep downward or upward angle such as when driving downhill or uphill, or in a sharp or high speed turn with high g-levels. The seatbelt is usually latched at a 0.2-0.5 g level of deceleration.

Both seatbelt systems employ a motor driven retractor, which retracts the seatbelt webbing from a pulled-out position toward the original, retracted, non-use position. A motor drives the shaft which carries one portion of the seatbelt in a wind-up reel. A latch mechanism, such as a tooth wheel and lever arrangement or a rack and pinion gear arrangement is coupled to the seatbelt retractor to lock the seatbelt from further extensions.

Seatbelt pre-tension systems are employed using a high force element, such as an air cylinder, explosive charge, etc., to lock the seatbelt from further extraction during a crash or collision event. Such pre-tensioner systems are responsive to a vehicle electronic control unit which uses information from vehicle mounted crash sensors to detect an actual crash event.

Such seatbelt pre-tensioners are employed to prevent further forward movement of the passenger toward the airbag during a crash event so that the passenger is positioned at a proper distance for airbag deployment.

However, it is common for a passenger or the vehicle driver to not be centered in an upright seated position in the seat. Drivers and passengers slouch, lean to one side or the other, lean forward or back for comfort, or when the car is experiencing high g-levels during sharp or high speed turns, or is driving at a steep downhill angle.

What is needed to insure proper airbag deployment effectiveness is a seatbelt system which moves the driver or passenger toward a center upright seated position in a vehicle seat prior to the start of an actual crash event.

SUMMARY

An advanced seatbelt apparatus and method of operation are disclosed which under pre-crash condition, retracts the seatbelt to move or shift the position of a user of the seatbelt toward a thinner upright position in a vehicle seat.

A seatbelt apparatus comprising a seatbelt mounted in a vehicle, a motor driven retractor coupled to the seatbelt for retracting the seatbelt onto a reel from a pulled out position, a latch coupled to the reel and movable from a first position spaced from the reel allowing free unwinding of the seatbelt from the reel and a second latched position locking the reel from further unwinding of the seatbelt from the reel, the latch, when in the second position, allowing winding movement of the reel to retract portions of the seatbelt onto the reel, a detector positioned to detect movement of the latch to the second position latching the reel from further unwinding of the seatbelt, and an output of the detector coupled to a motor for energizing the motor to partially retract the seatbelt from the pulled out position to change a portion of a user of the seatbelt in a vehicle seat.

The latch may include a claw normally spaced from teeth on the latch. The claw is coupled to a movable bead. The bead moves to a second position upon predetermined deceleration level or downhill angle of the vehicle or sideways directed "g" forces exceeding a threshold to engage the claw with the teeth on the latch and lock the seatbelt in the pulled out position.

The bead can be mounted on a surface and capable of longitudinal and lateral movement relative to the surface.

The detector can include a limit switch or a Hall-effect sensor or an optical sensor.

A method of operating a vehicle seatbelt is disclosed where a portion of a seatbelt is wound in a reel around a motor-rotated shaft. The method includes detecting one of a pre-crash braking deceleration, a downhill vehicle angle and a sideways vehicle "g" force above a threshold, and retracting the seatbelt for a predetermined period of time to urge the passenger enveloped by the seatbelt toward a center upright position in the vehicle seat.

In the method, the detecting step includes a sensor having an element movable in response to pre-crash braking deceleration, a downhill angle and a sideways vehicle "g" force. In response to the output of the sensor, the method activates the motor.

In the method, includes providing a toothed wheel on a shaft coupled to a motor, mounting a pivotal claw in relation to the toothed wheel so that the claw is removable from a first rest position where a tip of the claw is spaced from the toothed wheel allowing free bi-directional rotation of the toothed wheel to a latched position where the tip of the claw engages one of the teeth on the wheel and locks the wheel from movement in one rotational direction, when a movable bead engaged with a surface contacts the claw, the movable bead moving in a direction to pivot the claw to engage the tip of the claw with the toothed wheel under inertial forces exerted by braking deceleration, downhill vehicle angle, and a sideways vehicle "g" force.

BRIEF DESCRIPTION OF THE DRAWING

The various features, advantages and other uses of the advanced seatbelt system will become more apparent by referring to the following description and drawing in which.

DETAILED DESCRIPTION

Referring now to FIGS. 1-4, there is depicted an advanced seatbelt system utilizing a seatbelt apparatus and method of operation which causes a short duration retraction of the seatbelt to move the passenger captured by the seatbelt toward a center up-right position in a vehicle seat prior to the occurrence of an actual collision event.

Figure 1:
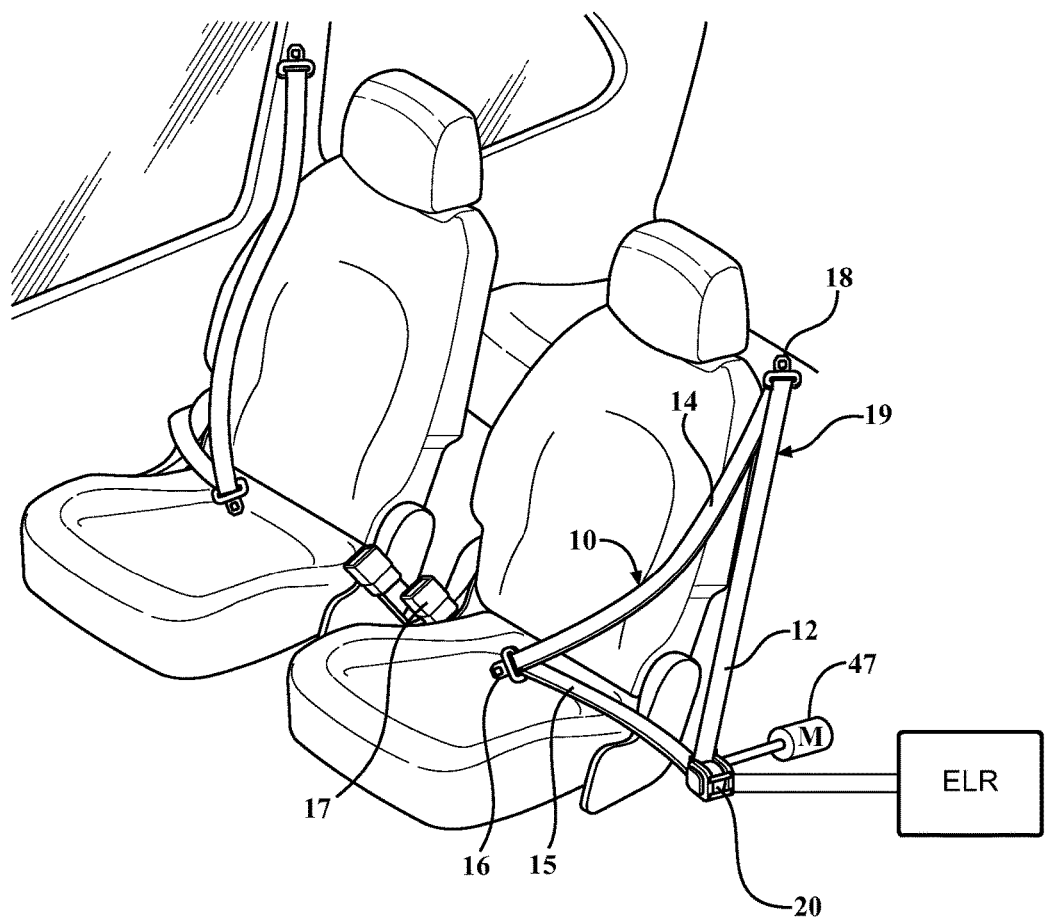
FIG. 1 is a pictorial representation of a vehicle seatbelt system, showing driver side and passenger side front seatbelts.

FIG. 1 depicts a typical vehicle driver side seatbelt 10 which is representative of a front seatbelt employed in a vehicle. The seatbelt 10 includes a continuous web 19 which has a portion wrapped in a reel around a rotatable shaft driven by a retractor 20. A vertically extending portion 12 extends from the reel on the retractor 20 through a clip 18 pivotally mounted on the vehicle door pillar. A chest portion 14 of the web 19 extends from the clip 18 through a tongue 16 which is releasably engageable with a buckle 17 fixed to the vehicle floor. A lap portion 15 of the seatbelt 10 extends from the tongue 16 to the reel in the retractor 20.

The retractor 20 allows the seatbelt web 19 to be extended away from the vehicle seat to allow the passenger to wrap the chest portion 14 and the lap portion 15 over his or her chest and upper legs until the tongue 16 can be securely engaged in the buckle 17. The retractor 20 is capable of retracting the web 19 to take up any slack which may exist in the seatbelt 10 so that the chest portion 14 and the lap portion 15 are snugly engaged across the passenger's chest and upper legs.

Both types of ELR and ALR seatbelt systems employ a motor driven retractor 20 which retracts the seatbelt 10 web 19 from a pulled out position back to an unused position. The motor driven retractor 20 drives a shaft 24 which carries one portion of the seatbelt 10 in a wind up reel. A latch 22, shown in FIGS. 2 and 3, is mounted on the shaft 24 and rotates with the shaft 24.

Figure 2:
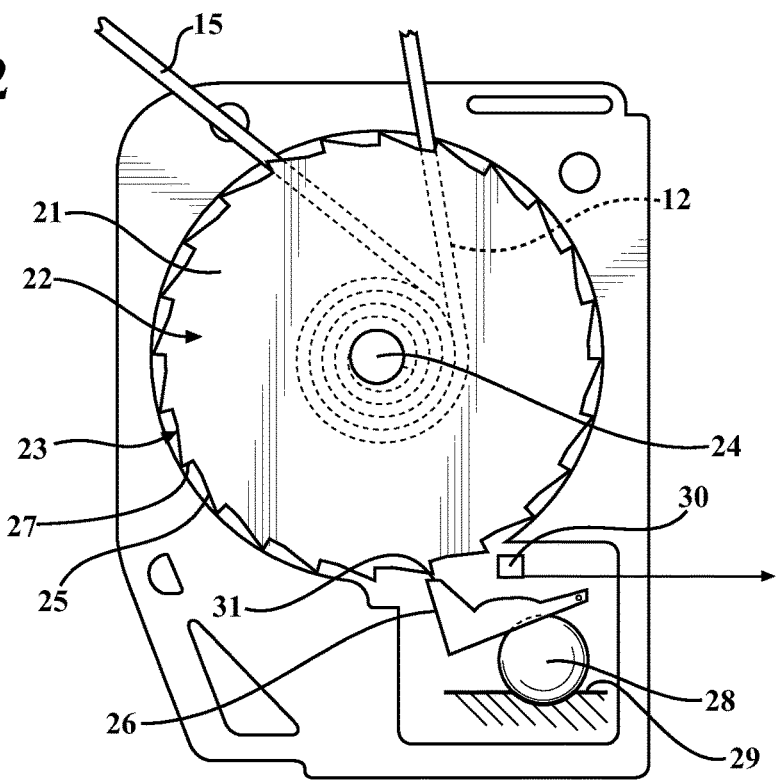
FIG. 2 is a side elevation view of one aspect of a seatbelt retractor employed in the seatbelt system in FIG. 1 and depicted in an unlatched position.
Figure 3:
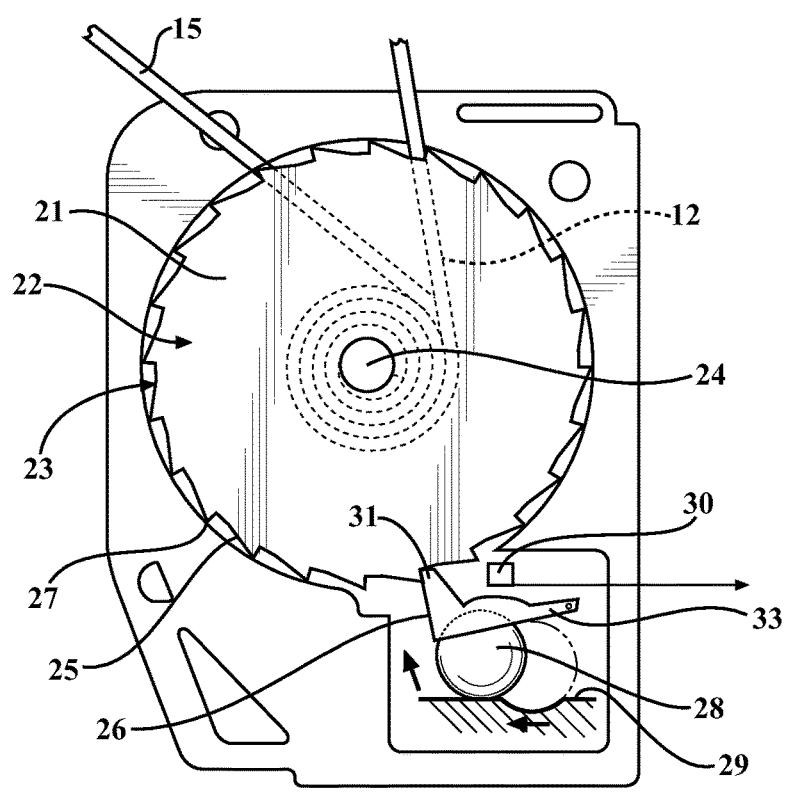
FIG. 3 is a side elevation view of the seatbelt retractor shown in FIG. 2; but depicted in a latched position.

The latch 22 may be any latch used in vehicle seatbelt systems, including a rack and pinion gear latch, or the toothed wheel latch shown in FIGS. 2 and 3 by example. The toothed latch 22 includes a rotatable disk-shaped wheel 21 fixedly mounted on and rotated with the shaft 24. A plurality of circumferentially arranged, spaced teeth 23 are formed on the peripheral of the wheel 21. Each tooth 23 is formed with a circumferentially extending, angled surface 25 which is separated from adjacent angled surfaces 25 on adjacent teeth 23 by a radially outward extending shoulder 27.

As shown in FIGS. 2 and 3, the angled surfaces 25 are oriented in the same direction relative to the shaft 24, the purpose of which will be described hereafter.

The latch 22 also includes a claw 26 in the form of a pivotally mounted lever having a tip 31 which is shaped to engage one tooth 23 on the wheel 21 at the juncture of the shoulder 27 and the angled surface 25 of a tooth 23. The tip 31 of the claw 26 is positioned so that once the tip 31 engages a tooth 23 on the wheel 21, further rotation of the wheel 21 in one direction, such as counter clockwise in the orientation of the wheel 21 and teeth 23 shown in FIGS. 2 and 3, is prevented. At the same time, an extension force by the driver on the seatbelt 10 to unwind the seatbelt 10 from the reel is permitted since the tip 31 of the claw 26 will ride around successive angled surfaces 25 of successively arranged teeth 23 on the wheel 21.

The claw 23 has a bottom recessed surface 33 which is engaged by a rotatable element or member, such as a ball or bead 28. The bead 28 rides within the recess in the surface 33 of the claw 26 as it moves along a fixed surface 29. Except for the engagement with the bottom recessed surface 33 of the claw 26 and the surface 29, the bead 28 is otherwise unattached to surrounding structure and is freely movable in response to vehicle motion, angular orientation, etc., as described hereafter.

Movement of the bead 28 from a first rest position shown in FIG. 2 to a forward located position shown in FIG. 3 is caused by inertial forces acting on the bead 28 by sudden braking deceleration of the vehicle above a threshold deceleration level. This deceleration creates inertial forces acting on the bead 28 causes the bead 28 to roll in a forward vehicle direction along the surface 29 forcing the bottom surface 33 of the claw 26 in an upward direction about its pivot point to move the tip 31 of the claw 26 toward the teeth 23 on the wheel 21.

When the bead 28 has moved sufficiently forward, as shown in FIG. 3, the tip 31 of the claw 26 is in a position to engage a tooth 23 on the wheel 21 latching the wheel 21 and the retractor 20 in a fixed position preventing further unwinding of the seatbelt 10 from the retractor 20.

It will be understood that forward motion of the bead 28 can also occur when the vehicle encounters a steep downhill angle. Gravity then acts on the bead 28 to pull the bead 28 to the forward position shown in FIG. 3.

The bead 28 can also move out of the recess and along the surface 29 under a lateral "g" force as might occur during a high speed turn, where the "g" force exceeds a threshold level.

A shallow recess may be formed in the surface 29 at the normal rest position of the bead 28 shown in FIG. 2. Such a recess will create a threshold force which must be exceeded by gravity or inertial before the bead 28 can begin its movement from the rest position for the forward vehicle position.

In FIG. 2, for normal vehicle operation, the tip 31 of the claw 26 is spaced from the teeth 23 on the wheel 21 since the bead or ball 28 is in the rest first position. However, upon inertia movement of the bead 28, as shown in FIG. 3, when the predetermined deceleration level is imposed on the vehicle, or a steep downward driving angle or sideways directed g forces are exerted on the head 28, the bead 28 changes position and pivots the claw 26 to bring the tip 31 into engagement with one tooth 23 on the latch 22 to lock the seatbelt 10 in a fixed position.

Regardless of different types of latching mechanism designs, the latch 22 status can be detected using a direct contact or a non-contact sensor or switch 30, which is then used as a switch to activate an electric motor to retract the seatbelt 10. This can be very effective to provide better protection for occupants from pre-crash or sudden maneuvers.

The electric motor will be activated once the latch status is detected as latched to remove the slack of the seatbelt 10.

The switch 30 can be contact between the claw tip 31 and the wheel 21 or by detecting changes in magnetic field strength (e.g.; a Hall effect sensor) or an optical sensor, or a limit switch based on the position of the claw 26.

Once the switch 30 is ON, electric power activates the motor 49 for a predetermined period of time regardless of subsequent switch status after the initial "ON" start signal in order to allow a determined amount of belt slack to be removed from the seatbelt 10.

Once this cycle is complete and the switch status changes to "OFF", the system resets the motor to release from the seatbelt locking mode and the motor will return to its original mode.

This system operates based on vehicle deceleration from braking, sudden maneuvers or by the angle of the vehicle body, etc. and it is an independent system that does not require CAN communication with other ECU's in the vehicle. This is a low cost system that can be easily adapted to the vehicles without requiring many changes to the vehicle electrical architecture.

An optional clutch, not shown, may be provided on the retractor 20 to temporarily disengage the motor from the shaft 24 to allow the passenger to freely extend the seatbelt 10 from the reel on the retractor.

Figure 4:
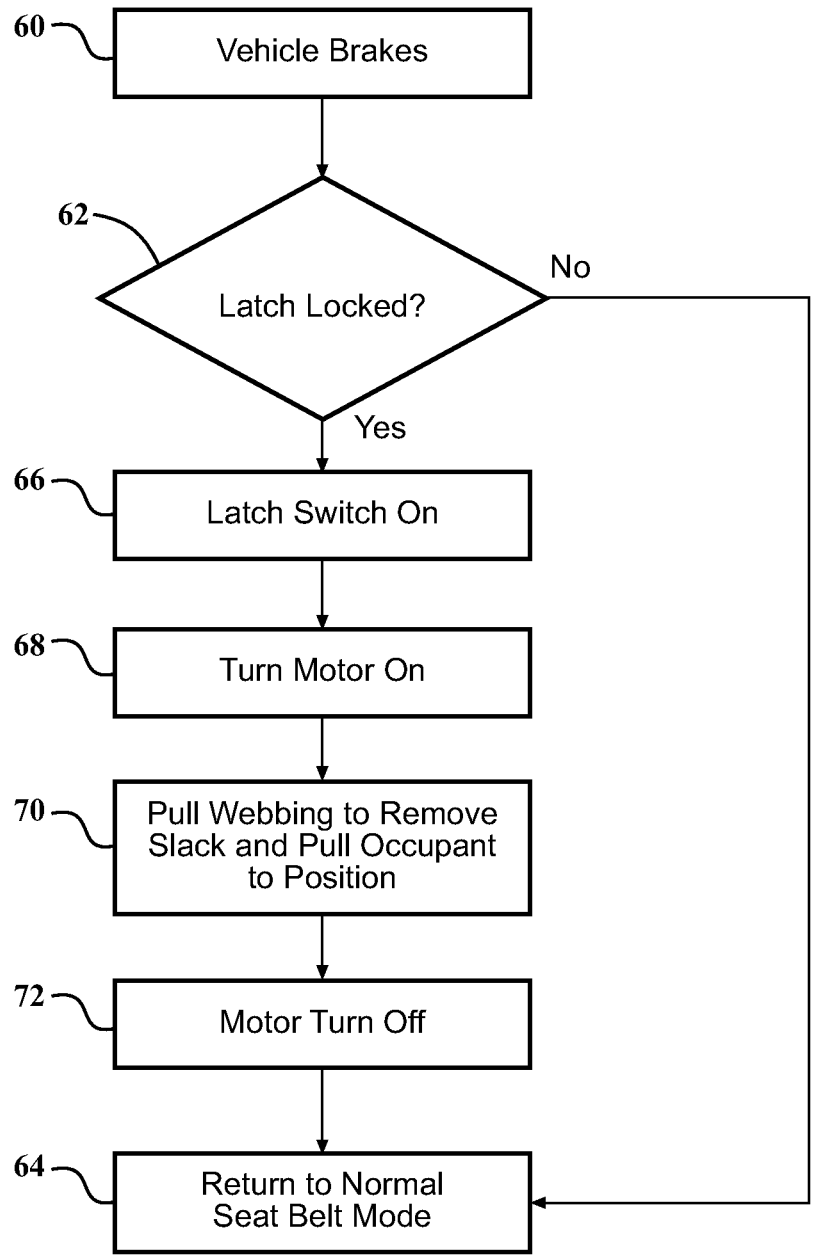
FIG. 4 is a flow diagram depicting the sequence of operation of the seatbelt retractor.

Referring now to FIG. 4, a flow chart is depicted showing the method of operation of the retractor 20 and the latch 22 according to the present seatbelt apparatus.

When the vehicle brakes in step 60 or on a steep downhill angle or experiences a high sideways g force, an electronic control unit mounted on the vehicle, which may be in the form of a processor executing control instructions stored in a memory, determines if the vehicle deceleration from braking on the downward angle or the g force is greater than a threshold level to activate the retractor 20 in step 62. If the vehicle deceleration downhill angle, or g force level is less than the threshold level, control moves to step 64 which returns to a normal seatbelt mode of operation.

However, if the vehicle deceleration, downhill angle, or g force is greater than the threshold level as determined in step 62, the latch 22 locks the retractor 20 in step 66 by engagement of the tip 31 of the claw 26 with one of the teeth 23 on the wheel 21. When the switch 30 is "ON" in step 67, the switch 30 output activates the motor 47 in step 68 for a predetermined time period. Activation of the motor 47 rotates the shaft 24 in a direction to wind portions of the seatbelt 10, such as the web portions 12 and 15 shown in FIGS. 2 and 3, onto the reel thereby exerting forces on the passenger to urge the passenger toward a center, upright position in the vehicle seat more suited for airbag deployment.

After the predetermined time period expires, the motor 47 turns off in step 72 and returns to a normal seatbelt mode of operation in step 64.

It will be understood that the above sequence of operation described in FIG. 4 applies equally to a severe downhill angle or sideways angle as would be exerted on the bead 28 to a high G turn or movement of the vehicle down a steep road.

The apparatus detects the locking status of the latch by adding a simple switch as opposed to a complicated ECU design. The switch need only detect ON and OFF states as opposed to continuously monitoring the level of contact.

The apparatus is independent from any ECU on the vehicle CAN bus and therefore does not require any complicated CAN communication with other ECUs in the vehicle. Some motorized seatbelts that have been recently introduced require communication with other ECUs in the active safety system, such as radar/camera/lidar, while the present apparatus only reacts to vehicle deceleration, vehicle angle and lateral "g" force.

The present apparatus can be easily retrofitted to current production vehicles without causing any interruption of existing ECU operation.

What is claimed is:

1. A pre-collision vehicle seatbelt retractor for use in repositioning a user of a vehicle seatbelt positioned in a vehicle seat, the seat belt retractor comprising:
   a seatbelt engaged with a reel connected to a vehicle;
   a latch selectively and lockingly engaged with the reel to selectively prevent extension of the seatbelt from the reel, the latch movable from an unlatched position spaced from the reel allowing extension of the seatbelt from the reel and a latched position locking the reel preventing further extension of the seatbelt from the reel;
   a latch actuator engaged with the latch to move the latch from the unlatched position to the latched position upon the vehicle achieving a predetermined threshold level of deceleration or acceleration, the latch actuator is separate and independent of an integral electronic control system of the vehicle; and
   a detector positioned to detect the latch in one of the latched or unlatched positions, the detector operable to send an output signal to energize a retractor motor to retract the seatbelt toward an unused seatbelt position subsequent to detection of the latch position in the latched position.

2. The seatbelt retractor of claim 1 wherein the latch actuator is responsive to
   a vehicle deceleration, or downhill angle of the vehicle or lateral directed "g" force exceeding a predetermined threshold level to engage the latch from the unlatched position to the latched position.

3. The seatbelt apparatus of claim 1 wherein the detector comprises:
   one of a limit switch, a Hall-effect sensor, an optical sensor or a contact switch.

4. The seatbelt retractor of claim 1 wherein the latch actuator further comprises:
   a spherical ball rollingly positioned on a fixed surface and rollingly engaged with the latch.

5. The seatbelt retractor of claim 4 wherein the latch further comprises:
   a claw defining a recessed surface for receipt of a portion of the spherical ball, the spherical ball operable to move the claw from the unlatched position to the latched position on the vehicle achieving the predetermined threshold level of deceleration or acceleration.

6. The seatbelt retractor of claim 5 wherein the latch further comprises:
   a wheel connected to the reel, the wheel having a plurality of teeth radially spaced about a circumference of the wheel, the claw lockingly engagable with one of the plurality of teeth preventing further extension of the seatbelt when the latch is in the latched position.

7. The seatbelt retractor of claim 6 wherein the claw further comprises:
   a tip engagable with one of the plurality of wheel teeth, the claw tip positioned on a first end of the claw in proximity of the wheel; and
   an axial pivot positioned adjacent a second end of the claw, the spherical ball positioned between the claw tip and axial pivot, the spherical ball operative to pivot the claw tip about the axial pivot to the latched position on movement of the spherical ball toward the claw tip on the vehicle achieving the predetermined threshold level of acceleration or deceleration.

8. The seatbelt retractor of claim 5 wherein the predetermined threshold vehicle acceleration or deceleration is a vehicle deceleration, a downhill angle or lateral directed "g" force.

9. The seatbelt retractor of claim 5 wherein the fixed surface further defines a recess for receipt of a portion of the spherical ball in a rest position where the vehicle is at a state below the predetermined threshold level of acceleration or deceleration.

10. The seatbelt retractor of claim 5 wherein the detector is a two-position switch defining an "on" position when the latch is in the latched position and an "off" position when the latch is in the unlatched position.

11. The seatbelt retractor of claim 5 wherein the detector is separate and independent of an integral electronic control system of the vehicle.

12. The seatbelt retractor of claim 1 further comprising:
    a retractor motor connected to the reel in communication with the detector, the motor operable to retract the seatbelt onto the reel toward an unused seatbelt position when the latch is in the latched position.

13. The seatbelt retractor of claim 12 further comprising a timer in communication with the retractor motor, the timer having a predetermined time period wherein the retractor motor remains energized to retract the seatbelt toward an unused position.

\* \* \* \* \*